United States Patent [19]
Stafford et al.

[11] Patent Number: 5,328,210
[45] Date of Patent: Jul. 12, 1994

[54] POLYOLEFIN COUPLER FOR JOINING POLYOLEFIN PIPES

[75] Inventors: Trevor G. Stafford; Lindsay Ewing, both of Whitley Bay, United Kingdom

[73] Assignee: British Gas plc, London, United Kingdom

[21] Appl. No.: 873,270

[22] Filed: Apr. 24, 1992

[30] Foreign Application Priority Data

Apr. 24, 1991 [GB] United Kingdom ................ 9109123

[51] Int. Cl.$^5$ .............................................. F16L 47/02
[52] U.S. Cl. ........................................ 285/21; 285/381
[58] Field of Search ........................... 265/21, 381, 423

[56] References Cited

U.S. PATENT DOCUMENTS

| | | | |
|---|---|---|---|
| 2,027,962 | 1/1936 | Currie | 285/381 |
| 3,086,242 | 4/1963 | Cook et al. | 285/381 |
| 3,320,355 | 5/1967 | Booker | 285/381 |
| 3,847,183 | 11/1974 | Meyer . | |
| 4,070,044 | 1/1978 | Carrow | 285/361 X |
| 4,198,081 | 4/1980 | Harrison et al. | 285/381 |
| 4,419,304 | 12/1983 | Ficke et al. . | |
| 4,530,521 | 7/1985 | Nyffeler | 285/381 X |
| 4,536,272 | 1/1987 | Riggs . | |
| 4,626,308 | 12/1986 | Ansell | 285/21 X |
| 4,650,226 | 3/1987 | McMills et al. | 285/381 |
| 4,770,442 | 9/1988 | Sichler | 285/21 |
| 4,775,501 | 10/1988 | Rosenzweig et al. . | |
| 4,927,184 | 5/1990 | Bourjot et al. | 285/21 |
| 5,125,690 | 6/1992 | Taylor | 285/21 |

FOREIGN PATENT DOCUMENTS

| | | |
|---|---|---|
| 0102919 | 3/1984 | European Pat. Off. . |
| 0197759 | 10/1986 | European Pat. Off. . |
| 0251482 | 1/1988 | European Pat. Off. . |
| 2252191 | 6/1975 | France . |
| 7339658 | 6/1975 | France . |
| 6601024 | 7/1967 | Netherlands . |
| 544906 | 1/1974 | Switzerland . |
| 2090558 | 7/1982 | United Kingdom . |
| 2216459 | 10/1989 | United Kingdom . |

OTHER PUBLICATIONS

International Application No. PCT/GB90/01793, International Publication No. WO91/07272 May 30, 1991.
English translation of European Patent No. 0102919 published Mar. 14, 1984.

*Primary Examiner*—Dave W. Arola
*Attorney, Agent, or Firm*—Larson and Taylor

[57] ABSTRACT

A coupler 10 consists of a length of cross-linked polyethylene pipe having a spiral groove 16 cut in its outer surface and another spiral groove cut in its inner surface. A heating element 18 is wound in the groove. The coupler is expanded mechanically so as to have an easy fit over the ends of polyethylene pipes 12, 14. The heater element 18 is energized and the coupler shrinks and forms fusion welded joints between itself and the pipes. No preparation of the pipe ends is necessary because the serrated inner surface cuts through the oxidized skin and bonds to material beneath the skin. The coupler is especially advantageous in large sizes of 500 mm or above. Instead of an electric heater, radiant energy, e.g. infra red or light is used to heat the coupler. For example, an array of reflector lamps can be used circumferentially located around the coupler.

7 Claims, 2 Drawing Sheets

5,328,210

POLYOLEFIN COUPLER FOR JOINING POLYOLEFIN PIPES

BACKGROUND OF THE INVENTION

The invention relates to polyolefin couplers for Joining polyolefin pipes; and to a method of joining such pipes.

Known couplers are widely used for joining pipes of up to 355 mm. Such couplers are of the socket type and have integral heating elements. The heating element melts the inside surface of the coupler and the opposed surfaces of the pipes. The opposed surfaces are generally spaced apart no more than 1-2 mm in the case of smaller couplers but the 355 mm size demands hydraulic fitting of the coupler and pipes. The gap in that case is virtually zero. The molten surfaces merge together and a welded joint is formed between each pipe and the coupler.

The object of the invention is to provide a coupler which can be used to join pipes especially, though not exclusively, pipes of large diameter, for example pipes of 500 mm or larger.

It has been proposed in U.S. Pat. No. 4,775,501 (Raychem Corporation) and in European Patent No. 0197759 (Raychem Corporation) to join polyethylene pipes by a coupler composed of cross-linked polymer containing a particulate conductive filler. The coupler was expanded below its melting point (120° C.). The coupler was recovered to join the pipes by passing a current through the coupler so as to heat it and shrink the coupler onto the pipes. The coupler and the pipes were joined by a fusion joint.

In the two examples quoted in U.S. Pat. No. 4,775,501, the polyethylene pipes had an outside diameter of 0.84 inch (21 mm). The coupler reached its shrinkage temperature in about 30-45 seconds and current was passed into the coupler for a further 1 minute.

The pipe end portions are shown as having shrunk and the end surfaces of the pipes appear to have melted. The result is a considerable reduction in the diameter of the through bore of the pipes.

In the sole example in EP 0197759 the pipes had an outside diameter of 21.3 mm and a wall thickness of 2.8 mm. The heating conditions were as in U.S. Pat. No. 4,775,501. No illustration is given in EP 0197759.

The couplers mentioned in the Raychem patents have to be electrically conductive and to achieve this they are made from a material containing carbon particles in such a concentration that they create on electrically conductive path. It is known that such high loadings of carbon particles can cause a deterioration in desirable mechanical properties of the base polymer.

SUMMARY OF THE INVENTION

This invention uses a coupler made from a polymer compound which is not electrically conductive. The heat shrink memory capability is activated by a separately identifiable heat source, for example by conduction from a resistance wire element or by radiation from an optical or infra-red source.

According to the invention, a coupler for joining pipes comprises an open-ended hollow body of non-conductive cross-linked polyolefin material which has been radially expanded so that before heating the coupler has a first least inner diameter and after heating the coupler has a second least inner diameter less than said first least inner diameter.

According to the invention, a method of joining a pipe of polyolefinic material to another pipe of polyolefinic material comprises arranging the pipes end-to-end with the coupler externally bridging their adjacent ends and heating the coupler so that the coupler shrinks and the opposing inner surface of the coupler and the outer end surfaces of the pipes are heated to welding temperature, the coupler being heated by light or infra-red radiation supplied by light or radiation emitting means arranged circumferentially around the coupler.

The coupler may have a heating element or elements capable of being electrically energised.

Using that form of coupler, the method is as before but the coupler is heated by energising the heating element or elements.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

The examples which follow refer to couplers made from polyethylene. However, the invention is applicable to other polyolefins, for example, polypropylene and polybutylene.

The first embodiment the of coupler was made from a 100 mm length of cross-linked polyethylene pipe supplied by Wirsbo Bruks AB of Virsbo, Sweden having an internal diameter of just less than the external diameter of 90 mm non-crosslinked polyethylene pipe which the coupler was intended to join. The coupler had an outer surface of 110 mm diameter and a wall thickness of 10 mm. A helical "thread" was cut into the internal and external surfaces to make the surfaces serrated. The pitch of the thread was 2 mm and the depth of the serrations was 2 mm.

On the outer surface was wound a tinned copper wire with a total resistance of 2.25 ohms. This provided a heater element.

The element could be provided in different ways (not shown). For example it could be wound in a helical groove on the outside of a very thin cylindrical, hollow member of polyethylene so that the turns of the winding were very close to the inner surface of the member. After winding the element, a protective outer sheath could be injection moulded around the outside of the member. That method of making a coupler is described in British Patent No. 2090558B.

In another method, the heating element is provided in a helical groove cut into the inner surface of the length of pipe. The outer surface is not provided with a thread. In yet another method, especially useful where thicker couplers are involved, two heating elements are used wound in respective threads cut in the outer and inner surfaces of the coupler.

The next stage is to expand the length of pipe which is to form the coupler. For example, a hydraulically-operated expander of the type supplied by Pipe Equipment Limited was used to expand the pipe until the clearance between the inner least diameter of the pipe and the outer surface of the polyethylene pipes to be joined was some 2 to 3 mm. The expansion may be carried out at ambient temperatures or at elevated temperatures up to about 120° C. After expansion at elevated temperature the coupler is rapidly cooled by water, for example. Alternatively, for example, the coupler can be expanded using an expander of the type supplied by Jointkit Limited.

Figure 1:
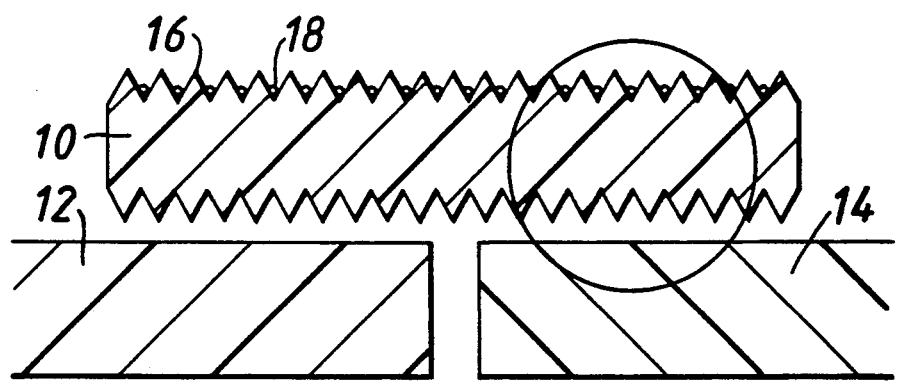
FIG. 1 is a vertical cross-section through the upper half of a first embodiment of coupler assembled around the ends of two pipes in position for joining them.
Figure 2:
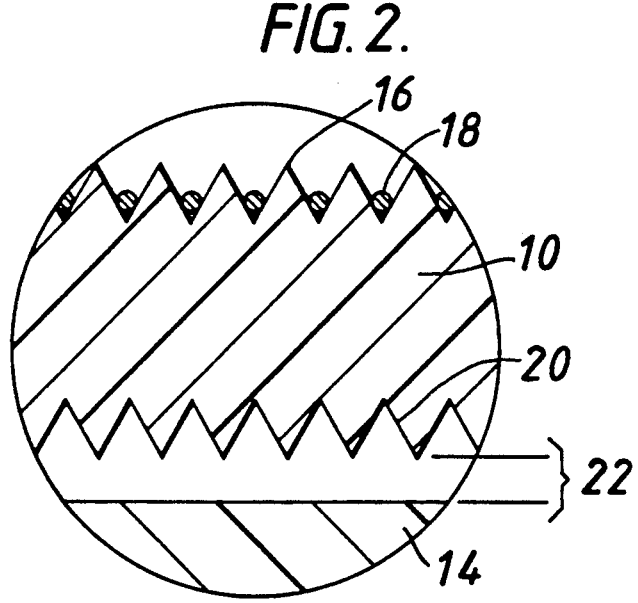
FIG. 2 is an enlarged scrap view of part of FIG. 1.

FIGS. 1 and 2 show the coupler 10 assembled with two polyethylene pipes 12, 14 placed end to end in position for joining them together. The helical external thread 16 is shown with the heating element 18 wound in the groove formed by the serrated outer surface. The internal thread 20 is also shown, with the gap 22 between the inner least diameter of the coupler and the outer external surface of the pipe 14.

Electric current from a 40 V power supply was applied to the heating element 18. Timed pulses of energisation were used and the external temperature of the coupler and the temperature of the outer surface of one of the pipes 12, 14 were monitored by thermocouples. The pulsing prevented the external temperature of the coupler exceeding 260° C. The outer surface temperature of the pipe was observed to rise steadily until, when it exceeded 140° C., the power was switched off. After cooling the coupler and the pipes were sectioned and it was found that welded joint had been formed.

The pipes 12, 14 joined by the coupler 10 were subjected to "80° C. Test" conditions. That is to say, that a hydrostatic pressure such as to give a pipewall stress of 4 megspascals was applied internally while the assembly was submerged in a water bath maintained at 80° C. For the SDR 11 pipe this hydrostatic test was equal to 8 bar internal pressure. To date the assembly has successfully undergone some 650 hours at the test conditions without leakage. The full test will be continued until 1000 hours have been completed successfully without leakage.

Figure 3:
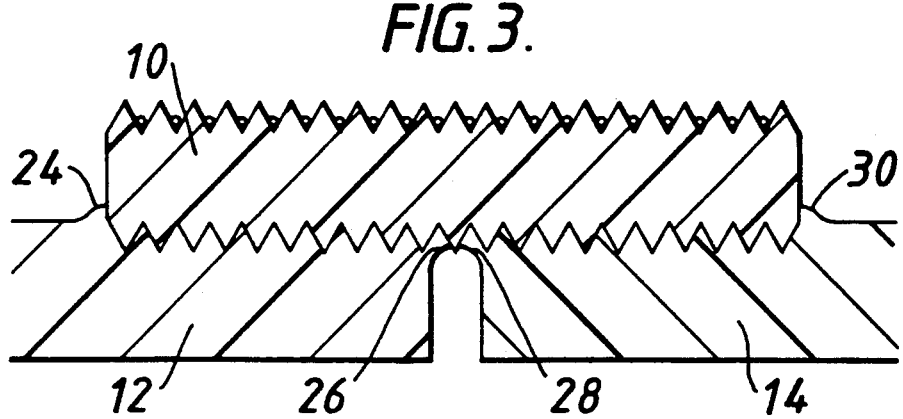
FIG. 3 is a vertical cross-section through the upper half of a completed joint using the coupler shown in FIG. 1.

As shown in FIG. 3, the coupler 10 had shrunk onto the pipes 12, 14 completely taking up the original clearance 22 and the serrated inner surface of the coupler 10 had entered the original outer surfaces of the pipes 12, 14 and had mechanically locked the joining surfaces. Some upset of the walls of the pipes 12, 14 is shown at 24, 26, 28 and 30.

No preparation of the pipe surfaces before welding had been made so that the original outer surfaces still carried the original oxidised layer. The coupler 10 had successfully pierced this oxidised layer during the formation of the fused welded joint.

In a modification, the serrations on the inner surface can be dispensed with and the pipe ends must then be scraped clean in the usual way before the welded joints are made between the opposed plain cylindrical surfaces of the pipes and coupler.

Figure 4:
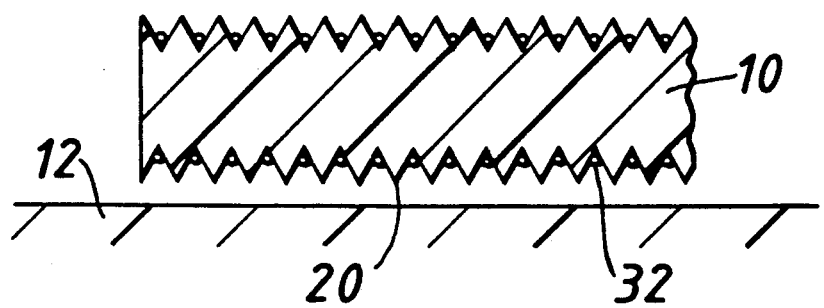
FIG. 4 is a vertical cross-section through the upper half of a modified coupler.

FIG. 4 shows a modified form of coupler 10. In this embodiment besides the heating element 18 wound on the outside, a second heating element 32 is wound on the inside surface and kept in position by the inner serrations 20 of the inner thread. This second element 32 is used where the thickness of the coupler would otherwise call for excessive temperature gradients across the coupler wall and long times of heating the wall through to the welding temperature at the inner surface.

By heating the wall from both sides the coupler is subjected to faster warming up and more rapidly reaches the welding temperature at the inner surface. In a 500 mm coupler, for example where the Standard Dimension Ratio is 17, the wall is about 30 mm and for an SDR of 11 the wall is about 46 mm. For couplers of any size having a wall of say 30 mm or greater, it is advantageous to use two heating elements.

In a further modification (not shown) the coupler can have only one heating element arranged like the element 32 just described.

Figure 5:
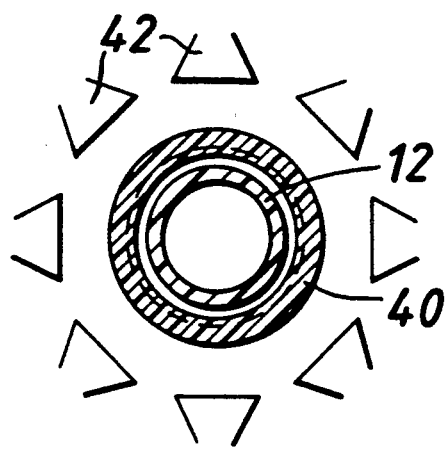
FIGS. 5 and 6 are a cross-sectional view and a longitudinal sectional view, respectively of a second embodiment of coupler assembled around the ends of two pipes in position for joining them.
Figure 6:
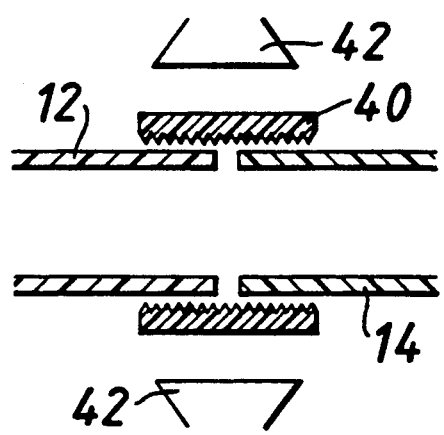
Figure 7:
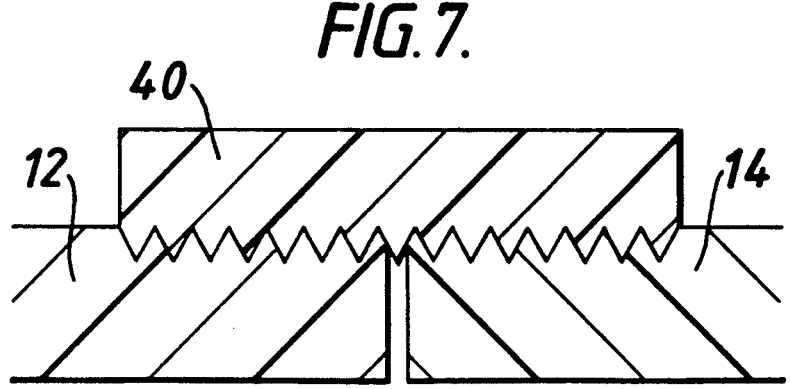
FIG. 7 is a view corresponding to FIG. 2 showing a completed joint using the coupler shown in FIGS. 5 and 6.

The embodiment of coupler 40 shown in FIGS. 5 to 7 was made in similar fashion to the coupler 10 except that no helical groove was cut into the outer surface and no heating element was applied to the surface.

With the pipes 12, 14 assembled in the coupler 40 as shown in FIGS. 5 and 6, the coupler 40 was heated by radiation from an array of eight 150 W lamps 42 fitted with reflectors.

As before, the outer temperature of the coupler and the outer pipe temperature were monitored. The temperature of the outer pipe surface went up steadily to 140° C. when the lamps were switched off. The coupler 40 became optically clear as it reached its own melting temperature, allowing better light transmission to the pipe surfaces and making the transfer of radiant heat more efficient. FIG. 7 shows the completed join between the two pipes 12 and 14.

The Figures described above are not drawn to scale.

Cross-linked polyethylene has the property of reaching the crystalline melting range of polyethylene without flowing. Its molecular structure has a three-dimensional network which confers the behaviour of a rubbery solid at temperatures above its melting point. In this phase it will form welded bonds with non-cross-linked polyethylene surfaces.

The expansion of the cross-linked coupler gives the coupler a heat shrink property which can improve the quality of the welded joint by removing the need to scrape the pipe end surfaces before fusion. Such surface preparation is an important, but time-consuming, aspect of conventional electrofusion. The heat shrink, cross-linked coupler has a serrated inner surface which melts the pipe surface and bites through the oxidised outer skin of the pipe to form a welded join with underlying material.

The invention is applicable to couplers in larger sizes, for example to couplers of 500 mm diameter and larger. Such couplers would be made from conventional polyethylene pipe which was then irradiated using gamma radiation to give a suitable level of cross-linking. Alternatively, couplers could be specially moulded using moulding grade polyethylene and chemically cross-linked (for example in the mould) to give the final cross-linked coupler.

Heating is achieved using electrical heating elements or using lamps or infra-red heaters. Reduced heating time could be achieved by pre-heating the coupler (e.g. to 100° C.) e.g. by switching on the heating element or heating elements or heating the coupler in an oven, for example, before fitting it to the pipes.

We claim:

1. A coupler joining pipes of non-cross-linked polyolefin material comprising an open-ended hollow body of non-conductive cross-linked polyolefin material, said hollow body having an inner surface extending between the open ends and having a heat shrink memory capability which has been radially expanded so that before heating said coupler inner surface; has a first least inner diameter which accommodates outer surfaces of said pipes with a clearance and after heating said coupler has shrunk and said inner surface has a second least inner diameter which is less than said first least inner diameter and which is less than an outer diameter of said pipes, and said inner surface which has said second least inner diameter has entered said outer surfaces of said pipes and has formed a welded joint with the polyolefin material of each said pipe underlying said outer surfaces and said outer surfaces exhibiting upset of said polyolefin material of said pipes.

2. A coupler according to claim 1, wherein said inner surface of said body includes serrations.

3. A coupler according to claim 2, wherein said serrations are separated by grooves and said coupler includes a heating element for heating said coupler, said heating element being located in said grooves, leaving said serrations exposed.

4. A coupler according to claim 3, wherein said heating elements include a first heating element located in said grooves and a second heating element located on the outside of said coupler.

5. A coupler according to claim 4, wherein said second heating element is located in grooves formed on the outer surface of said coupler.

6. A coupler according to claim 1, in which said coupler includes a heating element.

7. A coupler according to claim 6, wherein said body includes external grooves and said heating element is arranged in said grooves.

* * * * *